US008608821B2

(12) United States Patent
Canari

(10) Patent No.: US 8,608,821 B2
(45) Date of Patent: Dec. 17, 2013

(54) METHOD FOR THE PRODUCTION OF FERTILIZER AND CO2

(75) Inventor: Riki Canari, Mobile Post Judean Hills (IL)

(73) Assignee: Clue AS, Bergen (NO)

( * ) Notice: Subject to any disclaimer, the term of this patent is extended or adjusted under 35 U.S.C. 154(b) by 1019 days.

(21) Appl. No.: 12/063,429

(22) PCT Filed: Jul. 31, 2006

(86) PCT No.: PCT/IL2006/000882
§ 371 (c)(1),
(2), (4) Date: Dec. 4, 2008

(87) PCT Pub. No.: WO2007/017860
PCT Pub. Date: Feb. 15, 2007

(65) Prior Publication Data
US 2010/0132422 A1 Jun. 3, 2010

(51) Int. Cl.
*C05C 1/00* (2006.01)
*C05B 7/00* (2006.01)
*C01B 25/28* (2006.01)
*C01B 31/20* (2006.01)
*C01C 1/18* (2006.01)
*C01C 1/26* (2006.01)

(52) U.S. Cl.
USPC ........ 71/34; 71/58; 71/59; 423/310; 423/396; 423/420; 423/438

(58) Field of Classification Search
USPC .............. 423/420, 432, 637, 396, 310, 438; 71/34, 58, 59
See application file for complete search history.

(56) References Cited

U.S. PATENT DOCUMENTS

| 1,541,808 | A | * | 6/1925 | Greathouse | 423/396 |
| 2,087,325 | A | * | 7/1937 | Lawrence et al. | 423/396 |
| 2,852,340 | A | * | 9/1958 | Kippe | 423/162 |
| 3,518,073 | A | * | 6/1970 | Warshaw et al. | 71/60 |
| 3,579,297 | A | * | 5/1971 | Ekblom | 423/313 |
| 4,169,880 | A | * | 10/1979 | Cuer et al. | 423/166 |
| 4,174,379 | A | * | 11/1979 | Froehlich et al. | 423/396 |
| 6,074,521 | A | * | 6/2000 | Engdahl et al. | 162/29 |
| 6,344,066 | B1 | * | 2/2002 | Eyal | 71/34 |
| 2005/0238563 | A1 | * | 10/2005 | Eighmy et al. | 423/432 |
| 2005/0281728 | A1 | * | 12/2005 | Liu et al. | 423/432 |

* cited by examiner

*Primary Examiner* — Wayne Langel
(74) *Attorney, Agent, or Firm* — Baker Botts L.L.P.

(57) ABSTRACT

The invention provides a method for the combined production of (i) a fertilizer selected from the group consisting of ammonium nitrate, ammonium phosphates or a combination thereof, (ii) a concentrated stream of CO2 through an indirect neutralization of ammonia with an acid selected from the group consisting of nitric acid, phosphoric acid, a salt thereof and a combination thereof; said method comprising: (I) reacting a carbonate product with a reagent selected from the group consisting of nitric acid, phosphoric acid, a salt thereof, and a mixture thereof to form CO2, and a fertilizer containing an ammonia component; and (II) separating at least a portion of said carbon dioxide from said fertilizer in a condensed and relatively concentrated stream.

11 Claims, 6 Drawing Sheets

_US 8,608,821 B2_

METHOD FOR THE PRODUCTION OF FERTILIZER AND CO2

CROSS-REFERENCE TO RELATED APPLICATIONS

Figure 1:
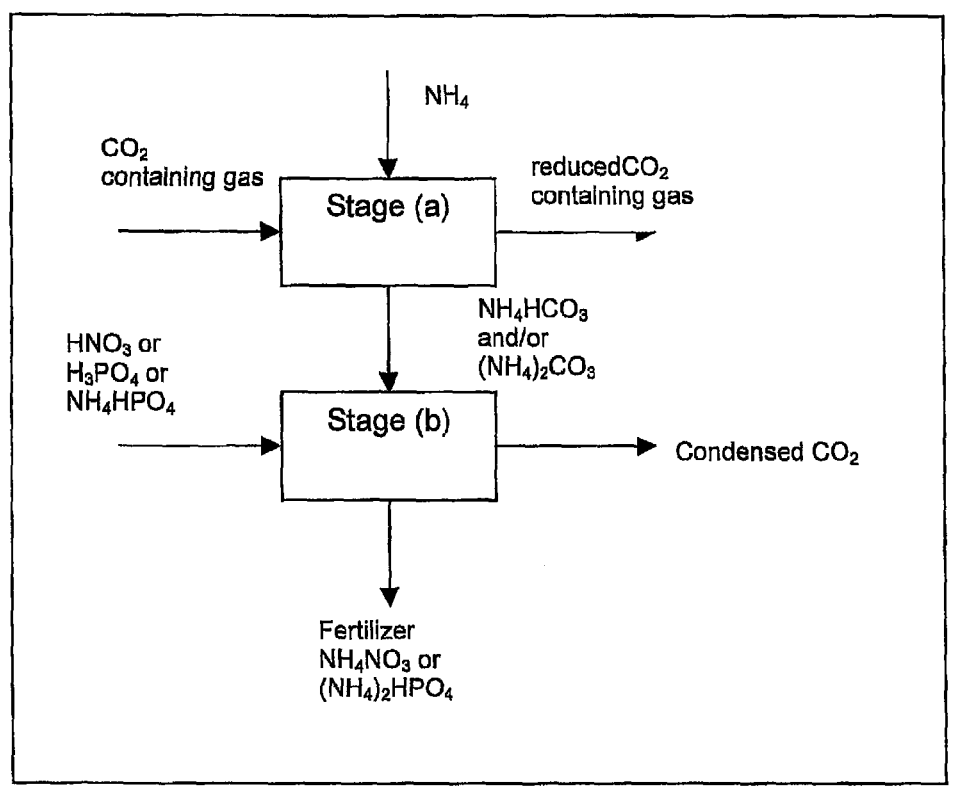

This application is the National Stage of International Patent Application No. PCT/IL2006/000882, filed Jul. 31, 2006, which claims the benefit of Israeli Patent Application No. 170239, filed Aug. 11, 2005, the disclosures of which are incorporated herein by reference.

TECHNICAL FIELD

The present invention relates to a method for the combined production of (i) a fertilizer selected from the group consisting of ammonium nitrate, ammonium phosphates or a combination thereof and (ii) a concentrated stream of $CO_2$ through an indirect neutralization of ammonia with an acid selected from the group consisting of nitric acid, phosphoric acid, a salt thereof and a combination thereof.

BACKGROUND ART

Fertilizers are used in large volumes of millions of tons per year. They are used all over the globe and throughout most of the year. Some of said fertilizers are salts produced by direct neutralization of an acid and a base. The main examples are ammonium nitrate, which is usually formed by the direct reaction of ammonia and nitric acid, and ammonium phosphates, usually formed in a reaction between phosphoric acid and ammonia. This direct reaction produces neutralization energy. The number of applications for said neutralization energy is limited.

The increasing effects of $CO_2$ emissions and global warming have challenged the industrialized world to find new and better ways to meet the increasing need for energy while reducing greenhouse gases. A treaty recently negotiated in Kyoto, Japan, would require developed-nations to reduce their emissions of greenhouse gases below the levels of 1990 by the year 2010. New strategies for economically controlling the emissions of greenhouse gases are therefore required.

Calcium oxide is manufactured by heating limestone ($CaCO_3$), coral, sea shells, or chalk, which are mainly $CaCO_3$, to drive off carbon dioxide according to the reaction: $CaCO_3 \rightarrow 500\text{-}600°\ C. \rightarrow CaO+CO_2$ This reaction is reversible; calcium oxide will react with carbon dioxide to form calcium carbonate. Yet, the reaction is driven to the right by flushing carbon dioxide from the mixture as it is released. When calcium oxide is mixed with water, it forms calcium hydroxide according to the reaction: $CaO+H_2O \rightarrow Ca(OH)_2$.

The production of calcium oxide from limestone is one of the oldest chemical transformations produced by man. In Old English, its name is līm, which is the origin of the modern commercial name for calcium oxide, namely lime. Lime has many properties that make it quite valuable. It is so useful, that it is today produced industrially on a vast scale; over 20 million metric tons were produced in the U.S. in 2000. Some of the disadvantages of this process are as follows: 1. High energy consuming in order to react in these high temperatures 2. Emission of huge amounts of flue gases with high concentration of $CO_2$ (more than 20%) 3. Difficulties in using the emitted $CO_2$ since the flue gases includes $SO_2$ and $NO_x$.

An object of the present invention is to combine the production of (i) a fertilizer selected from the group consisting of ammonium nitrate and ammonium phosphates; and (ii) a concentrated stream of $CO_2$.

Another object is to produce the fertilizer through indirect neutralization of ammonia with an acid selected from the group consisting of nitric acid, phosphoric acid and a combination thereof.

A further object is to utilize the driving force associated with the production of the fertilizer, which is available in large amounts, in many locations and through most of the year, for the production of carbon compounds from carbon dioxide containing gases.

Still another object of the present invention is to reduce air pollution caused by $CO_2$.

Another object of the present invention is to provide an alternative process for the traditional process of calcium oxide/calcium hydroxide production from limestone, an environmentally friendly one, in order to produce calcium oxide with the production of a relatively clean stream of $CO_2$ of commercial value without the need for the high energy consumption presently required in the prior art processes.

DISCLOSURE OF THE INVENTION

With this state of the art in mind, there is now provided, according to the present invention, a method for the combined production of a (i) fertilizer selected from the group consisting of ammonium nitrate, ammonium phosphates or a combination thereof and (ii) a concentrated stream of $CO_2$ through an indirect neutralization of ammonia with an acid selected from the group consisting of nitric acid, phosphoric acid, a salt thereof and a combination thereof; said method comprising:

(I) reacting a carbonate product with a reagent selected from the group consisting of nitric acid, phosphoric acid, a salt thereof, and a mixture thereof to form $CO_2$, and a fertilizer containing an ammonia component; and (II) separating at least a portion of said carbon dioxide from said fertilizer in a condensed and relatively concentrated stream.

In preferred embodiments of the present invention there is provided a method for the combined production of (i) a fertilizer selected from the group consisting of ammonium nitrate, ammonium phosphates or a combination thereof and (ii) a concentrated stream of $CO_2$ through an indirect neutralization of ammonia with an acid selected from the group consisting of nitric acid, phosphoric acid, a salt thereof and a combination thereof, said method comprising:

(a) reacting a carbon dioxide containing gas with a base capable of forming a carbonate product upon reaction with $CO_2$, whereby a carbonate product is formed;

(b) reacting a carbonate product containing a $CO_2$ component from step (a) with a reagent selected from the group consisting of nitric acid, phosphoric acid, a salt thereof, and a mixture thereof to form said fertilizer and $CO_2$, and (c) separating at least a portion of said carbon dioxide from said fertilizer in a condensed and relatively concentrated stream.

The carbon dioxide containing gas used is step (a) could result from various industrial productions involving the combustion of hydrocarbons, production of iron and steel, but of the highest interest is the use of flue gas from combustion of oil and coal. The carbon dioxide containing gas is contacted, preferably after removal of flying ash and temperature adjustment.

In preferred embodiments of the present invention, the concentration of the carbon dioxide in said carbon dioxide containing gas in step (a) is less than 30% and said condensed and relatively concentrated carbon dioxide stream formed in step (c) is a stream of at least 70% $CO_2$, preferably a gas stream.

In a preferred embodiment the carbon dioxide containing gas is contacted with ammonia (see FIG. 1) and liquor is added, whereby a carbonate-containing product is formed and the resulting gas has a reduced $CO_2$ content. The ammonia can be introduced in solution or in a gaseous form. The liquor could be water or an aqueous solution, including a recycled stream containing ammonium carbonate, ammonium bicarbonate, ammonium sulfate, ammonium sulfite, a stream formed in a following step, such as a mother liquor from the separation in step (c), or a stream from another process, such as the bleed stream from a limestone wet scrubbing (LWS) plant. The product containing carbonate formed in step (a), which can be a solid or liquid, is reacted with a reagent selected from the group consisting of nitric acid, phosphoric acid, and a mixture thereof. The reaction forms said fertilizer and a concentrated stream of carbon dioxide gas. If for simplicity we represent the carbonate product formed in step (a) as ammonium bicarbonate in the liquor, some of the reactions in this stage could be presented as:

$$2NH_4HCO_3+H_3PO_4 \rightarrow (NH_4)_2HPO_4+2CO_2+2H_2O; \quad (1)$$

$$NH_4HCO_3+HNO_3 \rightarrow NH_4NO_3+CO_2+H_2O; \text{ and} \quad (2)$$

$$NH_4HCO_3+NH_4H_2PO_4 \rightarrow (NH_4)_2HPO_4+CO_2+H_2O. \quad (3)$$

In these reactions, as well as in the following ones, the chemistry could be much more complicated than shown by the equation.

Figure 2:
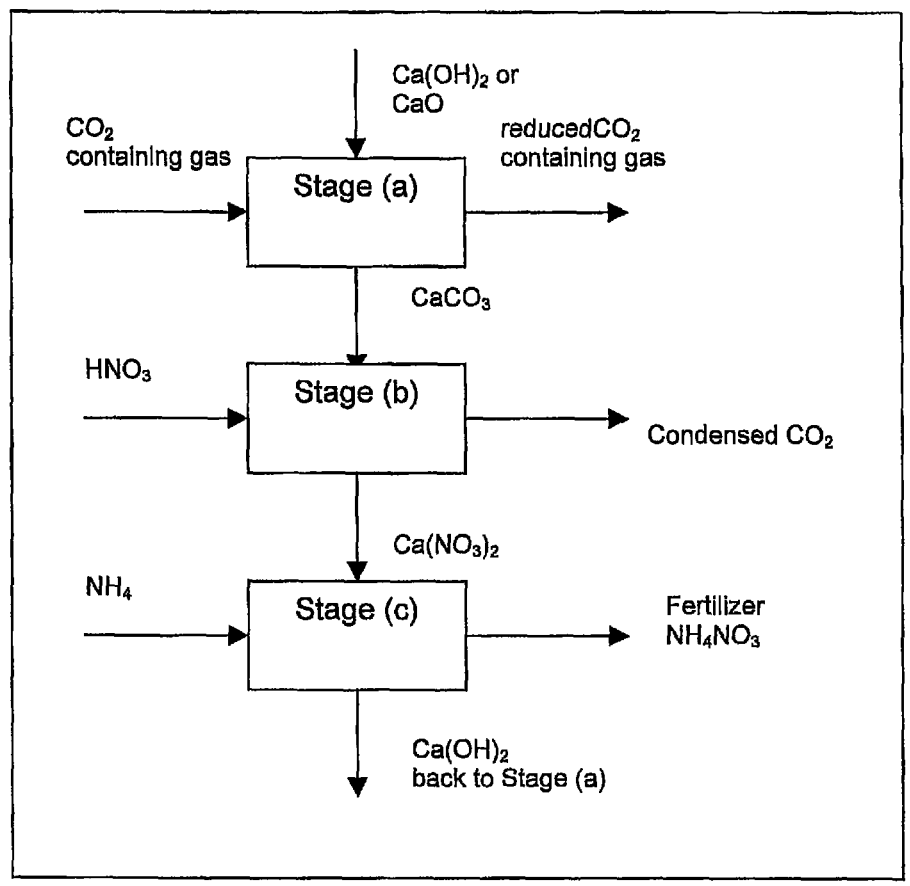
Figure 3:
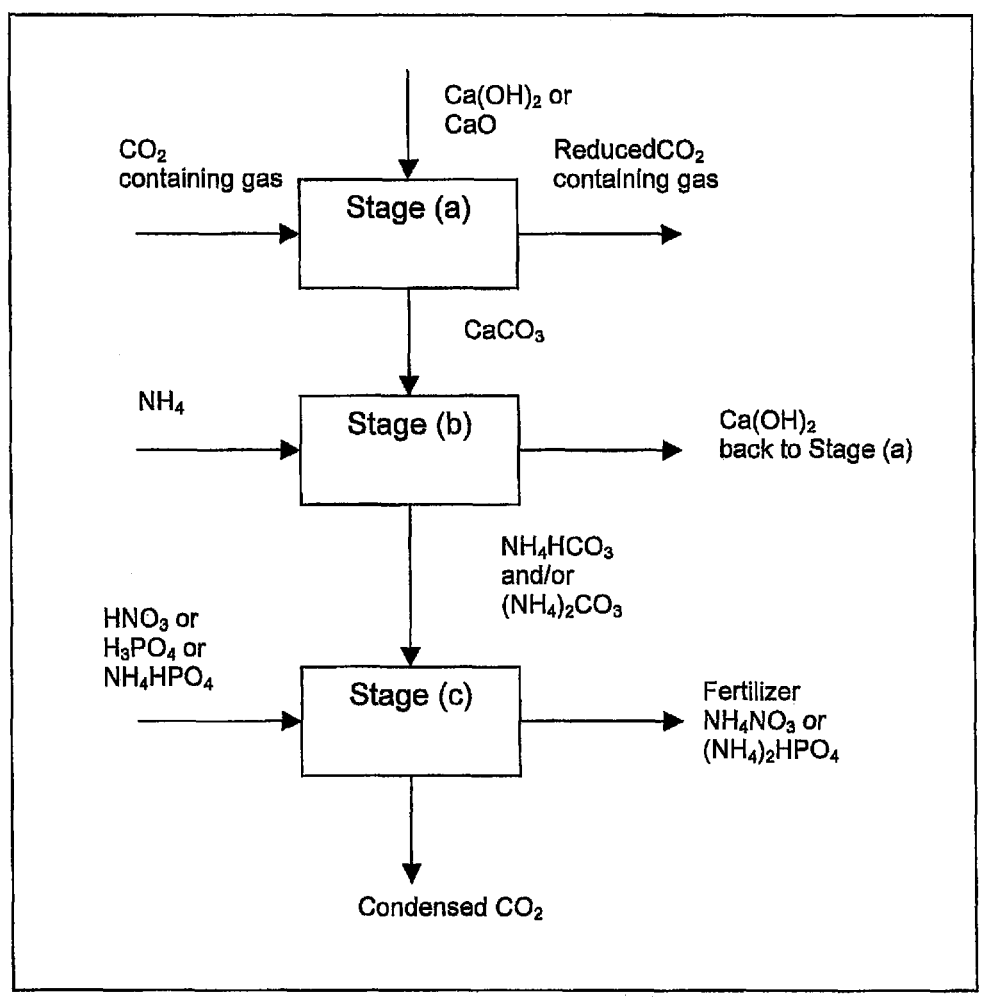

In another preferred embodiment the carbon dioxide containing gas is contacted with a base other than ammonia in the first step, (see FIGS. 2 and 3). However, in a later step of the process the base is swapped to form the said ammonium carbonate product.

The selected base in these preferred embodiments is one that is characterized by very low solubility in an aqueous solution, thus, it can be easily separated from the solution of ammonium salt in the later step. Said base is selected from the group consisting of $Ca(OH)_2$, CaO, and a mixture thereof, a solid sorbent, or an organic base (with a limited solubility in an aqueous phase).

According to one embodiment the functional groups of said solid sorbent and said organic base are selected from the group consisting of a primary amine, a secondary amine, a tertiary amine and a combination thereof.

Some of the reactions in this step could be presented as:

$$Ca(OH)_2+CO_2+H_2O \rightarrow CaCO_3+2H_2O; \quad (4)$$

$$R_3N_{solid}+CO_2+H_2O \rightarrow R_3NH^{+-}HCO_{3\ solid}+H_2O; \text{ and} \quad (5)$$

$$R_3N_{organic}+CO_2+H_2O \rightarrow R_3NH^{+-}HCO_{3\ organic}+H_2O. \quad (6)$$

$Ca(OH)_2$ and CaO can be introduced as a suspension in an aqueous solution. Said aqueous solution could be water or an aqueous solution, including a recycled stream containing ammonium carbonate, ammonium bicarbonate, ammonium sulfate, ammonium sulfite, ammonium nitrate, calcium nitrate, a stream formed in a following step, such as a mother liquid from the separation in step (c), or a stream from another process, such as the bleed stream from a limestone wet scrubbing (LWS) plant.

In one embodiment, which may be demonstrated also in FIG. 2, in Step (b) the carbonate product is reacting first with a reagent selected from the group consisting of nitric acid, phosphoric acid, a salt thereof and a mixture thereof to form condensed $CO_2$ and an intermediate product that is formed by the reaction between the base (in Step (a)) and the reagent. Some of the reactions in this step could be presented as:

$$CaCO_3+2HNO_3 \rightarrow Ca(NO_3)_2+CO_2+H_2O; \quad (7)$$

$$R_3NH^{+-}HCO_{3\ solid}+HNO_3 \rightarrow R_3NH^{+-}NO_3+CO_2+H_2O; \text{ and} \quad (8)$$

$$R_3NH^{+-}HCO_{3\ organic}+HNO_3 \rightarrow R_3NH^{+-}NO_{3\ organic}+CO_2+H_2O. \quad (9)$$

Where, in a second stage, the above intermediate product is then reacted (in Step (c)) with ammonia to form the said fertilizer and thereby regenerates at least a portion of the said base, some of the reactions in this step could be presented as:

$$Ca(NO_3)_2+NH_4^+OH^- \rightarrow NH_4NO_3+Ca(OH)_2; \quad (10)$$

$$R_3NH^{+-}NO_{3\ solid}+NH_4^+OH^- \rightarrow NH_4NO_3+R_3N_{solid}; \text{ and} \quad (11)$$

$$R_3NH^{+-}NO_{3\ organic}+NH_4^+OH^- \rightarrow NH_4NO_3+R_3N_{organic}. \quad (12)$$

In another preferred embodiment the sequence of step (b) and (c) of the above embodiment is switched (see FIG. 3). In this embodiment a carbon dioxide containing gas is contacted with a said base (Step (a)), whereby a carbonate product is formed and the resulting gas has a reduced $CO_2$ content. In Step (b) the carbonate product is reacting with ammonia to form an ammonium salt selected from the group of ammonium carbonate, ammonium bicarbonate and a mixture thereof and thereby regenerating at least portion of the said base. The above ammonium salt is then reacted (in Step (c)) with a reagent selected from the group consisting of nitric acid, phosphoric acid, a salt thereof and a mixture thereof to form condensed $CO_2$ and the said fertilizer.

According to one embodiment, in the case wherein said base is selected from the group consisting of $Ca(OH)_2$ and CaO, the formation of calcium carbonate in stage (a) occurs naturally and the process uses mined calcium carbonate. In this process, mined calcium carbonate is reacted with nitric acid to form $Ca(NO_3)_2$ and $CO_2$ wherein at least a portion thereof is separated in a condensed and relatively concentrated stream. In the next stage, the formed $Ca(NO_3)_2$ is reacted with ammonia to form the fertilizer, $NH_4NO_3$, and $Ca(OH)_2$.

Figure 4:
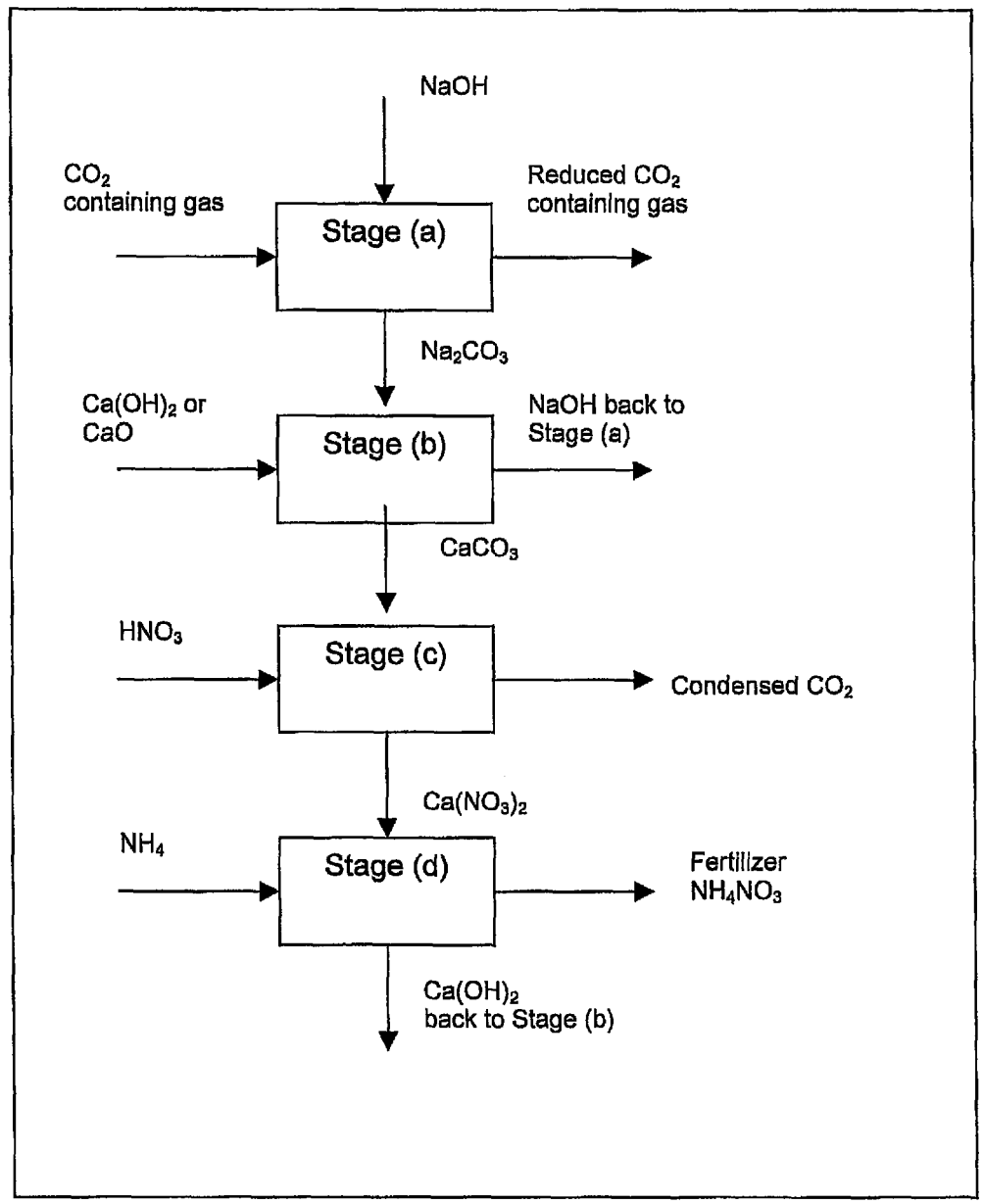
Figure 5:
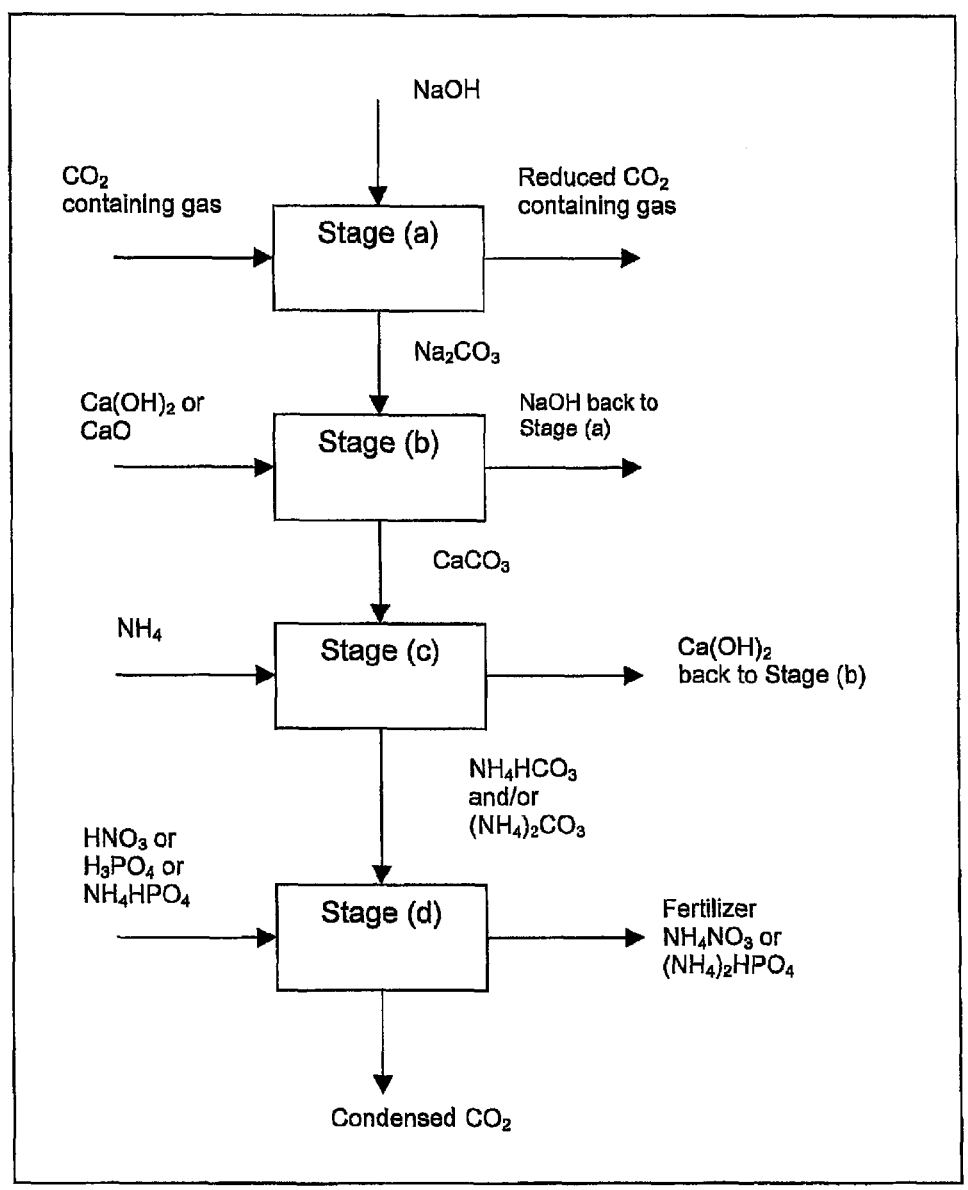

According to one embodiment, in a case wherein said base is selected from the group consisting of $Ca(OH)_2$, CaO, and a mixture thereof, an additional base named as a first base (see FIGS. 4 and 5) is added to the process. In this process said base that is selected from the group consisting of $Ca(OH)_2$, CaO, and a mixture thereof is named as the second base. Said first base is selected from the group of NaOH, KOH, a primary amine soluble in aqueous solution, a secondary amine soluble in aqueous solution, a tertiary amine soluble in aqueous solution or combination thereof. In this case, the first base is acting as a stimulator for the absorption of the $CO_2$. In the case of NaOH as the first base and $Ca(OH)_2$ as the second base, in step (a) NaOH is reacted in an aqueous solution with $CO_2$ to form sodium salt of sodium carbonate, sodium bicarbonate or a mixture thereof. In step (b) calcium hydroxide is reacted with said sodium salt to form calcium carbonate and thereby regenerating the first base that is recycled to step (a). Some of the reactions in step (a) and (b) could be presented as:

$$2NaOH+2CO_2+2H_2O \rightarrow 2Na_2CO_3; \text{ and,} \quad (13)$$

$$2Na_2CO_3+Ca(OH)_2 \rightarrow CaCO_3+2NaOH \quad (14)$$

respectively.

In the following steps said calcium carbonate is contacted with said reagent to form condensed $CO_2$ and an intermediate product formed by the reaction between said second base and the reagent, and, in a separate step said intermediate product is reacted with ammonia to form said fertilizer and thereby regenerates at least a portion of said second base that is recycled back.

In another embodiment the sequence of these last two steps are switched. The formed $CaCO_3$ is contacted with ammonia to form an ammonium carbonate product and thereby regenerates at least a portion of said second base, $Ca(OH)_2$, which is recycled. This step is followed by reacting said ammonium carbonate product with a reagent selected from the group consisting of nitric acid, phosphoric acid, a salt thereof, and a mixture thereof to form $CO_2$, and said fertilizer.

According to a further embodiment, in a case wherein said base is selected from the group consisting of $Ca(OH)2$, CaO, and a mixture thereof (second base), an additional base is added to the process (first base) the first and the second base are added in one stage, whereby, step (a) and step (b), as demonstrated in equations (13) and (14), are in fact conducted in one stage.

Figure 6:
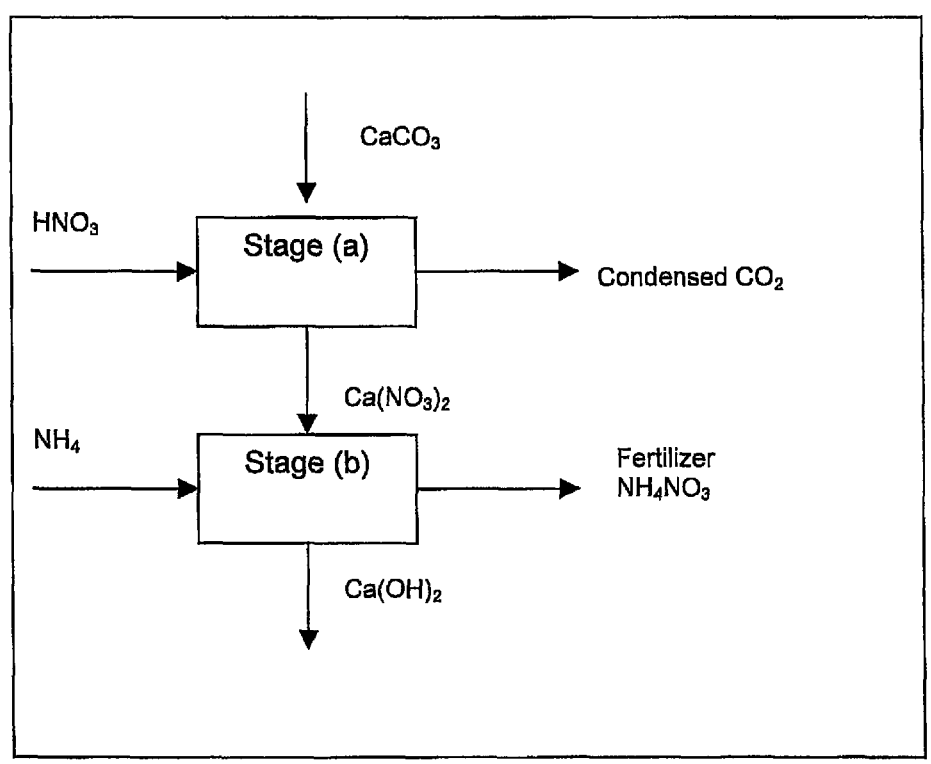

In another preferred embodiment of the present invention there is provided an alternative process for the traditional process of calcium hydroxide production from limestone, an environmentally friendly one. In this case (see FIG. 6), calcium carbonate is contacted with nitric acid to form calcium nitrate and $CO_2$, that is separated from said calcium nitrate solution in a condensed and relatively concentrated stream. In the next step the calcium nitrate solution is reacted with ammonia to form ammonium nitrate which is a fertilizer and thereby regenerating at least a portion of $Ca(OH)_2$. The $Ca(OH)_2$ is precipitated and thereby at least a portion of it is separated from said fertilizer. These reactions could be presented as:

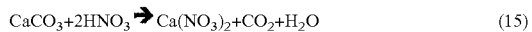
$$CaCO_3 + 2HNO_3 \rightarrow Ca(NO_3)_2 + CO_2 + H_2O \quad (15)$$

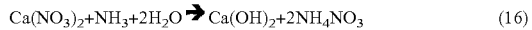
$$Ca(NO_3)_2 + NH_3 + 2H_2O \rightarrow Ca(OH)_2 + 2NH_4NO_3 \quad (16)$$

Thus the present invention also provides a process for the combined production of (i) a fertilizer selected from the group consisting of ammonium nitrate, ammonium phosphates or a combination thereof and (ii) a concentrated stream of $CO_2$ through an indirect neutralization of ammonia with an acid selected from the group consisting of nitric acid, phosphoric acid, a salt thereof, and a combination thereof; said method comprising:
  (a) reacting $CaCO_3$ with nitric acid to form $CO_2$, and calcium nitrate;
  (b) separating at least a portion of said $CO_2$ from said calcium nitrate solution in a condensed and relatively concentrated stream;
  (c) reacting the calcium nitrate solution with ammonia to form ammonium nitrate which is a fertilizer and thereby regenerating at least a portion of $Ca(OH)_2$;
  (d) separating at least a portion of said fertilizer from the mixture formed in step (c).

In all the processes according to the present invention a fertilizer selected from the group of ammonium nitrate, ammonium phosphate, ammonium biphosphate and a mixture thereof is produced.

A technique that is widely used in industry to remove $CO_2$ from gas streams that contain carbon dioxide in a low concentration, is separating the $CO_2$ by using a solution of an amine such as monoethanolamine, diethanolamine, triethanolamine, diglycolamine, methyldiethanolamine, and diisopropanolamine. Such patents are U.S. Pat. No. 1,783,901 and U.S. Pat. No. 1,934,472. This reaction is reversible, allowing the solution to be regenerated by heating. However a disadvantage of such a process is that the energy required for the regeneration of the solvent is high (1.0 to 2.0 MJ/kg $CO_2$). Moreover, the carbon dioxide stream obtained after solvent regeneration is at low pressure.

Similar technique of using ammonia process for removal $CO_2$, $SO_2$ and $No_x$ from gases is suggested by Resnik et. Al. (Aqua Ammonia for Simultaneous Removal of $CO_2$, $SO_2$ and $No_x$ International Journal of Environmental Technology Management Vol. 4 Nos. 1/2, 2004 by Kevin P. Resnik, James T. Yeh, Henry W. Pennline). This technique has the same disadvantages as the above one.

U.S. Pat. No. 6,447,437 describes a method for converting $CO_2$, CO, $NO_x$, and $SO_x$ emissions into carbonate-containing-fertilizers, mainly $NH_4HCO_3$ and/or $(NH_2)_2CO_3$, plus a small fraction of $NH_4NO_3$ and $(NH_4)_2SO_4$.

The similarity between this patent and the present invention is the fact that $NH_4HCO_3$ is formed from flue gases during the process, yet it differs in several other important aspects.

The final product, in the process described in U.S. Pat. No. 6,447,437, is $NH_4HCO_3$ and/or $(NH_2)_2CO$ that contains a small fraction of $NH_4NO_3$ and $(NH_4)_2SO_4$.

In contradistinction, the $NH_4HCO_3$ formed in the process presented in the present invention is only an intermediate product while the final products are (i) a fertilizer selected from the group consisting of ammonium nitrate, ammonium phosphates or a combination thereof, and (ii) a concentrated stream of $CO_2$.

In addition, U.S. Pat. No. 6,447,437 differs from the present invention in the type of the reaction for the formation of $NH_4HCO_3$. The U.S. Pat. No. 6,447,437 focuses on condensation reactions of $N_2$ with $CO_2$ with the presence of additives. These reactions are characterized by high activation energy, thus, a catalyst is required where the preferred catalysts include nanometer-structured and/or hybridized metallocatalysts of Ru, Os, W, Fe, Pt, Pd, and Ni, and/or hybridized metallocatalysts of Ru, Os, W, Fe, Pt, Pd, and Ni.

In contradistinction, two reactions are used in the present invention, which are neutralization and ion-exchange reaction. These reactions are simple and fast and neither requires a catalyst since they are characterized by high reaction-rates and low activation energy. As a result they may be conducted at room temperature.

There are some patents such as U.S. Pat. Nos. 6,344,066; 3,625,720; and 5,624,649, which describe the absorption of $SO_2$ in ammonia solution. Some properties of $SO_2$, are related to those of $CO_2$, e.g. both compounds are in the gas phase at atmospheric conditions, and both react with water to form acidic compound, $H_2SO_3$ sulfurous acid and $H_2CO_3$ carbonic acid, respectively.

Yet, in many other aspects, the $SO_2$ system is totally different from that of the $CO_2$ system, and therefore, one system does not teach the other. Carbonic acid is a relatively weak acid with a pKa1 of 6.35 and a pKa2 of 10.33, while the first and the second pKa of sulfurous acid are 1.85 and 7.2, respectively. These systems are very different especially when the reacted base is a weak one, such as ammonia (ammonium pKa is of about 9 which is lower than the pKa2 of carbonic acid).

In the case of reacting sulfurous acid with ammonia, a stable dibasic salt is formed, which is $(NH_4)_2SO_3$, ammonium sulfite. In contrast, $CO_2$ reacts with ammonia to form a mixture of ammonium carbonate $(NH_4)_2CO_3$ and ammonium bicarbonate $NH_4HCO_3$. The reason for that is the fact that the ammonia acts as a weaker base related to the protonated second acidic group of the carbonic acid, thus although a stoichiometric ratio of 2:1 of ammonia to carbonic acid is added to the system, the compounds are not stoichiometrically reacted. Additionally, ammonium carbonate and ammonium bicarbonate are characterized by a foul odor, which has to be considered in the process.

In addition, these acid-base properties of the ammonia and carbonic acid are the reason for the fact that ammonium carbonate is an unstable salt that decomposes at relatively low temperature, about 60° C. at atmospheric conditions, to form ammonia and $CO_2$. The low stability of ammonium carbonate salt at relatively low temperature is a critically important issue especially in the case of $CO_2$ absorption from flue gases, which are emitted at temperatures of about 200-400° C.

There are some patents in which a base selected from the group of $Ca(OH)_2$, and CaO, (see, e.g., WO94/01203) a solid sorbent, NaOH (see, e.g., JP2002293537), KOH, primary secondary or tertiary amine soluble in aqueous solution (see, e.g., U.S. Pat. No. 1,783,901 and U.S. Pat. No. 1,934,472) or combination thereof are used to react with $CO_2$ to form the respective carbonate product. However, in none of said publications is there described or suggested a formation of condensed $CO_2$ and a regeneration of said base to form the free base while indirectly using neutralization-energy from the production of a fertilizer selected from the group of ammonium nitrate, ammonium phosphate, ammonium biphosphate and a mixture thereof.

In all the processes according to the present invention ammonia is introduced into one of the steps and an acid, such as nitric, phosphoric or a combination thereof, is introduced into another step which is a totally separate step. An ammonium fertilizer is formed. Thus, the overall process related to equation (1) could be presented in a simplified form as:

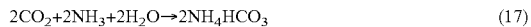
$$2CO_2 + 2NH_3 + 2H_2O \rightarrow 2NH_4HCO_3 \tag{17}$$

$$2NH_4HCO_3 + H_3PO_4 \rightarrow (NH_4)_2HPO_4 + 2CO_2 + 2H_2O \tag{1}$$

$$2NH_3 + H_3PO_4 \rightarrow (NH_4)_2HPO_4 \tag{18}$$

In this process, as well as all other processes according to the present invention, a product salt, or at least a part of it, is formed from the base, ammonia, and the acid, which are introduced at separate steps of the process. Thus, their reaction is indirect and the energy of neutralization is not evolved as thermal energy in whole or in part. Instead, through the process, this energy, in some cases along with other energies, such as crystallization energy, provides the driving force for $CO_2$ separation from the gas containing it.

The fertilizer formed in the process of the present invention could be used in solution or in a crystallized form. Energy for water evaporation could result from the thermal energy of the flue gas. $NH_4HCO_3$ presence in fertilizer solutions or crystals is possible since that $NH_4HCO_3$ acts itself as a carbonate-containing fertilizer.

While the invention will now be described in connection with certain preferred embodiments in the following examples and with reference to the accompanying figures so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

In the drawings:

FIGS. 1-6 present flow diagrams of embodiments of the present invention.

DESCRIPTION OF PREFERRED EMBODIMENTS

Example 1

A gaseous mixture of 95% nitrogen and 5% $CO_2$ at 15° C. is bubbled through a column filled with a concentrated aqueous solution containing ammonia. The $CO_2$ content of the gas at the outlet of the column is reduced by more than one-half, and the resulting solution, contains a mixture of $(NH_4)_2CO_3$ and $NH_4HCO_3$.

Example 2

A gaseous mixture of 95% nitrogen and 5% $CO_2$ at 15° C. is bubbled through a column filled with a concentrated aqueous solution containing NaOH. The $CO_2$ content of the gas at the outlet of the column is reduced by more than one-half, and the resulting solution, contains $NaHCO_3$ crystals.

Example 3

A gaseous mixture of 95% nitrogen and 5% $CO_2$ at 15° C. is bubbled through a column filled with an aqueous suspension of $Ca(OH)_2$. The $CO_2$ content of the gas at the outlet of the column is reduced by more than one-half, and the resulting solution, contains $CaCO_3$ crystals.

Example 4

$CaCO_3$ crystals formed in EXAMPLE 3 where contacted with an aqueous solution of 50% $HNO_3$. Bubbles of $CO_2$ were released from the crystals and a mixture solution of $HNO_3$ and $CaNO_3$ was formed. In a later stage aqueous solution of 60% ammonia was added to the mixture solution of $HNO_3$ and $CaNO_3$, crystals of $Ca(OH)_2$ were precipitated and a solution of ammonium nitrate was formed.

Example 5

A gaseous mixture of 88% nitrogen, 10% $CO_2$ and 2% $SO_2$ is bubbled through a column filled with a concentrated aqueous solution containing ammonia. The $CO_2$ and $SO_2$ content of the gas at the outlet of the column is reduced by more than one-half, and the resulting solution, contains $NH_4HCO_2$, $(NH_4)_2CO_2$ and $(NH_4)_2SO_3$. This solution is reacted with $Ca(NO_3)_2$ to form $NH_4NO_3$, insoluble $CaCO_3$ and $CaSO_3$ crystals. The remaining aqueous solution, containing ammonium nitrate, is transferred to an evaporator crystallizer to recover the equivalent amount of ammonium nitrate.

Example 6

A gas composed of about 73% $N_2$, 13% $CO_2$, 10% $H_2O$, 4% $O_2$ and 0.3% $SO_2$ at 15° C. is bubbled slowly through a column containing ammonia solution. More than 50% of the $CO_2$ and 90% of the $SO_2$ in the incoming gas is adsorbed.

Example 7

A gas composed of about 73% $N_2$, 13% $CO_2$, 10% $H_2O$, 4% $O_2$ and 0.3% $SO_2$ at 25° C. is bubbled through a column containing aqueous suspension of $Ca(OH)_2$. More than 50% of the $CO_2$ and 90% of the $SO_2$ in the incoming gas is adsorbed.

Example 8

Part of the solution formed in Example 3 is reacted with a solution of 30% nitric acid. The relative volumes of the solutions are selected so that the molar ratio of nitric acid to (ammonia+ammonium ions) is 1.1 to 1.0. Ammonium nitrate is formed and most of the $CO_2$ and $SO_2$ is released.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for the combined production of (i) a fertilizer selected from the group consisting of ammonium nitrate, ammonium phosphate and combinations thereof and (ii) a concentrated stream of carbon dioxide ($CO_2$); said method comprising:
   (a) contacting a $CO_2$ containing gas with a first base selected from the group consisting of calcium oxide, calcium hydroxide, a stream that contains the same, and combinations thereof and a second base selected from the group of NaOH, KOH, a primary amine soluble in aqueous solution, a secondary amine soluble in aqueous solution, a tertiary amine soluble in aqueous solution, a stream that contains the same, and combinations thereof, whereby a carbonate product is formed;
   (b) reacting the product resulting from step (a) with ammonia to form ammonium carbonate product and thereby regenerating at least a portion of said first base;
   (c) separating at least a portion of ammonium carbonate product from said regenerated base;
   (d) reacting the said ammonium carbonate product with a reagent selected from the group consisting of nitric acid, phosphoric acid, a salt thereof, and a mixture thereof to form $CO_2$ and said fertilizer;
   (e) separating at least a portion of said $CO_2$ formed in step (d) from said fertilizer in a condensed and relatively concentrated stream.

2. A method according to claim 1, wherein said stream of $CO_2$ formed in step (d) is a stream of at least 70% $CO_2$.

3. A method according to claim 2 wherein said stream of at least 70% $CO_2$ is a gas stream.

4. A method according to claim 1, wherein the resulting gas in step (a) has a reduced $CO_2$ content.

5. A method for the combined production of (i) a fertilizer selected from the group consisting of ammonium nitrate, ammonium ammonium phosphate and combinations thereof and (ii) a concentrated stream of carbon dioxide ($CO_2$); said method comprising:
   (a) contacting a $CO_2$ containing gas with a first base selected from the group consisting of NaOH, KOH, a primary amine soluble in aqueous solution, a secondary amine soluble in aqueous solution, a tertiary amine soluble in aqueous solution, a stream that contains the same, and combinations thereof, whereby a first carbonate product is formed by the reaction of the $CO_2$ and said first base and the resulting gas has a reduced $CO_2$ content;
   (b) reacting the said first carbonate product with a second base selected from the group consisting of calcium oxide, calcium hydroxide, a stream that contains the same, and combinations thereof whereby a second carbonate product is formed, and thereby regenerating at least a portion of said first base;
   (c) reacting the product resulting from step (b) with ammonia to form ammonium carbonate product and thereby regenerating at least a portion of said second base;
   (d) separating at least a portion of ammonium carbonate product from said regenerated base;
   (e) reacting the said ammonium carbonate product with a reagent selected from the group consisting of nitric acid, phosphoric acid, a salt thereof, and a mixture thereof to form $CO_2$, and said fertilizer;
   (f) separating at least a portion of said $CO_2$ formed in step (e) from said fertilizer in a condensed and relatively concentrated stream.

6. A method according to claim 5, wherein said stream of $CO_2$ formed in step (e) is a stream of at least 70% $CO_2$.

7. A method according to claim 6, wherein said stream of at least 70% $CO_2$ is a gas stream.

8. A method for the combined production of (i) a fertilizer selected from the group consisting of ammonium nitrate, ammonium phosphate and combinations thereof and (ii) a concentrated stream of carbon dioxide ($CO_2$); said method comprising:
   (a) contacting a $CO_2$ containing gas with a first base selected from the group consisting of NaOH, KOH, a primary amine soluble in aqueous solution, a secondary amine soluble in aqueous solution, a tertiary amine soluble in aqueous solution, a stream that contains the same, and combinations thereof, whereby a first carbonate product is formed by the reaction of the $CO_2$ and said first base and the resulting gas has a reduced $CO_2$ content;
   (b) reacting the said first carbonate product with a second base selected from the group consisting of calcium oxide, calcium hydroxide, a stream that contains the same, and combinations thereof whereby a second carbonate product is formed, and thereby regenerating at least a portion of said first base;
   (c) reacting said second carbonate product with a reagent selected from the group consisting of nitric acid, phosphoric acid, a salt thereof, and a mixture thereof to form $CO_2$, and an intermediate product formed by the reaction between said second base and the reagent;
   (d) separating at least a portion of said $CO_2$ from said intermediate product in a condensed and relatively concentrated stream;
   (e) reacting the said intermediate product with ammonia to form the said fertilizer and thereby regenerating at least a portion of said second base;
   (f) separating at least a portion of said fertilizer from the mixture formed in step (e).

9. A method according to claim 8, wherein said stream of $CO_2$ formed in step (c) is a stream of at least 70% $CO_2$.

10. A method according to claim 9, wherein said stream of at least 70% $CO_2$ is a gas stream.

11. A method according to any one of claims 1, 5 or 8, wherein the concentration of the $CO_2$ in said $CO_2$ containing gas in step (a) is less than 35%.

* * * * *